United States Patent

Tanaka et al.

[11] Patent Number: 5,837,642
[45] Date of Patent: Nov. 17, 1998

[54] HEAT-RESISTANT OXIDE

[75] Inventors: Hirohisa Tanaka; Mari Yamamoto, both of Gamo-gun, Japan

[73] Assignee: Daihatsu Motor Co., Ltd., Osaka, Japan

[21] Appl. No.: 734,074

[22] Filed: Oct. 21, 1996

[30] Foreign Application Priority Data

Dec. 26, 1995 [JP] Japan ..................... 7-339733
Dec. 26, 1995 [JP] Japan ..................... 7-339734

[51] Int. Cl.$^6$ ...................................... B01J 23/00
[52] U.S. Cl. ............................................. 502/304
[58] Field of Search ................... 502/303, 304, 502/78, 65, 64; 423/213.5

[56] References Cited

U.S. PATENT DOCUMENTS 4,808,564  2/1989  Matsumoto et al. .............. 502/303
4,927,799  5/1990  Matsumoto et al. .............. 502/303
5,075,276 12/1991  Ozawa et al. ..................... 502/304

FOREIGN PATENT DOCUMENTS 63-116741 A  5/1988  Japan .
63-116742 A  5/1988  Japan .

Primary Examiner—Gary P. Straub
Assistant Examiner—Tanaga Boozer
Attorney, Agent, or Firm—Kubovcik & Kubovcik

[57] ABSTRACT

Provided is a heat-resistant oxide exhibiting excellent oxygen storage capacity under a high temperature oxidation-reduction fluctuating atmosphere regardless of reduction of its specific surface area, and this heat-resistant oxide is expressed in the following general formula:

$$Ce_{1-(x+y)}Zr_xR_yO_{2-z}$$

where R represents a rare earth metal, z represents an oxygen deficiency, x represents an atomic ratio of 0.15 to 0.70, y represents an atomic ratio of 0.05 to 0.25, and x+y represents a range of 0.20 to 0.95 respectively.

11 Claims, No Drawings

HEAT-RESISTANT OXIDE

BACKGROUND OF THE INVENTION

1. Field of the Invention

The present relates to a composite oxide which is employed as a catalyst for efficiently purifying carbon monoxide (CO), hydrocarbon species (HC) and nitrogen oxides (NOx) contained in exhaust gases from an automobile engine or the like.

2. Description of the Background Art

Development of a three-way catalyst which can simultaneously purify carbon monoxide (CO), hydrocarbon species (HC) and nitrogen oxides (NOx) contained in automotive emissions has been heretofore promoted in relation to a catalyst for purifying exhaust gases, and a three-way catalyst containing a noble metal such as platinum, palladium or rhodium as an active material is well known in the art.

In order to improve the activity of such a three-way catalyst, a function (oxygen storage capacity) of cerium oxide ($CeO_2$) occluding or liberating oxygen in a gas phase is noted and a gas phase atmosphere in oxidative reaction of CO and HC and reductive reaction of NOx is adjusted for improving purification efficiency by adding cerium oxide to the three-way catalyst. For example, Japanese Patent Publications Nos. 58-20307 (1983) and 59-41775 (1984) and Japanese Patent Laying-Open No. 59-90695 (1984) disclose techniques employing cerium oxide.

In practice, however, the catalyst for purifying exhaust gases may be employed under a high temperature exceeding 800° C. Under such a high temperature, cerium oxide is granularly grown (sintered) and reduced in specific surface area, such that the purification performance of the catalyst is disadvantageously reduced due to reduction of the oxygen storage capacity on the cerium oxide surface.

Therefore, a method of suppressing such grain growth of cerium oxide by adding zirconium or lanthanum thereto (refer to Japanese Patent Laying-Open No. 61-262521 (1986) or 262522 (1986)) has been proposed. In this case, however, cerium oxide loses its original characteristics due to segregation of zirconium on the cerium oxide grains. Thus, this method is rather impractical under a high temperature.

SUMMARY OF THE INVENTION

Accordingly, an object of the present invention is to provide a heat-resistant oxide having the optimum composition which can exhibit oxygen storage capacity originally provided in cerium oxide regardless of reduction of its specific surface area under a high temperature.

The present invention is directed to a heat-resistant oxide which is expressed in the following general formula:

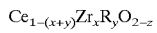

$$Ce_{1-(x+y)}Zr_xR_yO_{2-z}$$

where R represents a rare earth metal, z represents an oxygen deficiency, x represents an atomic ratio of 0.15 to 0.70, y represents an atomic ratio of 0.05 to 0.25, and x+y represents a range of 0.20 to 0.95 respectively.

The inventive heat-resistant oxide exhibits excellent oxygen storage capacity regardless of reduction of its specific surface area also under a high temperature exceeding 800° C., and can be preferably employed as a promoter for purifying exhaust gases with a fluctuating gas composition of a gas-phase atmosphere under a high temperature. When another catalytic-active component such as a noble metal, for example, is contained, further, the heat-resistant oxide can be preferably employed as a three-way catalyst for purifying exhaust gases as such due to combination of the oxygen storage capacity of cerium oxide and excellent catalytic activity of the noble metal.

When the atomic ratio x is 0.40 to 0.70, the atomic ratio y is 0.15 to 0.25 and x+y is in the range of 0.55 to 0.95 in the above general formula, reduction of catalytic activity is extremely small and the heat-resistant oxide can retain oxygen storage capacity which is substantially equivalent to that in an initial stage of employment even under a high temperature oxidation-reduction fluctuating atmosphere of about 1000° C.

The foregoing and other objects, features, aspects and advantages of the present invention will become more apparent from the following detailed description of the present invention.

DESCRIPTION OF THE PREFERRED EMBODIMENTS

Examples of the rare earth metal R which is useful for forming at least a part of the inventive heat-resistant oxide as a composite oxide and/or a solid solution are yttrium, scandium, lanthanum, praseodymium, neodymium, promethium, samarium, europium, gadolinium, terbium, dysprosium, holmium, erbium, thulium, ytterbium and lutetium, and yttrium (Y) which can readily form a composite oxide and/or a solid solution is preferably employed. Such a rare earth metal R may be singly employed, or two or more rare earth metals R may be combined with each other.

The atomic ratio of the rare earth metal R represented by y is in the range of 0.05 to 0.25. Stability of the heat-resistant oxide is deteriorated under a high temperature if the atomic ratio y is less than 0.05, while the rare earth metal R may form a different compound if the atomic ratio y exceeds 0.25.

On the other hand, the atomic ratio of zirconium (Zr) represented by x is in the range of 0.15 to 0.70. Grain growth of cerium oxide cannot be effectively suppressed if the atomic ratio x is less than 0.15, while zirconium may form a different compound if the atomic ratio x exceeds 0.70.

Further, x+y is in the range of 0.20 to 0.95. If this value x+y is less than 0.20 or exceeds 0.95, the oxygen storage capacity of cerium oxide cannot be exhibited under a high temperature.

Thus, the atomic ratio of cerium (Ce) is 1−(x+y), the value obtained by subtracting the atomic ratios x and y of zirconium (Zr) and the rare earth metal R.

Further, z representing the oxygen deficiency indicates the ratio of holes in a fluorite crystal lattice structure generally formed by an oxide of cerium, zirconium and a rare earth metal.

When the atomic ratio of the rare earth metal R represented by y is preferably set in the range of 0.15 to 0.25, more preferably in the range of 0.20 to 0.25, the atomic ratio of zirconium (Zr) represented by x is preferably set in the range of 0.40 to 0.70, more preferably in the range of 0.60 to 0.70, and the value x+y is preferably set in the range of 0.55 to 0.95, more preferably in the range of 0.80 to 0.95, further, the obtained heat-resistant oxide has extremely small reduction of catalytic activity even under a high-temperature oxidation-reduction fluctuating atmosphere of about 1000° C. and can retain oxygen storage capacity which is substantially equivalent to that in the initial stage of employment.

The heat-resistant oxide according to the present invention can be prepared by a well-known method. For example, water is added to cerium oxide powder for forming a slurry, an aqueous solution which is prepared by mixing a zirconium salt and a rare earth metal salt with each other in a prescribed stoichiometric ratio is added to the slurry. The mixture is sufficiently stirred and thereafter oxidized, for obtaining the inventive heat-resistant oxide.

While the cerium oxide powder may be prepared from any of commercially available products, powder having a large specific surface area is preferably employed in order to improve the oxygen storage capacity, preferably with crystal grain sizes of not more than 0.1 $\mu$m. About 10 to 50 parts by weight of water is added to 1 part by weight of such cerium oxide powder, to prepare a slurry.

Examples of the zirconium salt and the rare earth metal salt are inorganic salts such as sulfates, nitrates, hydrochlorides and phosphates and organic salts such as acetates and oxalates, and nitrates are preferably employed. The zirconium salt and the rare earth metal salt are dissolved in 0.1 to 10 parts by weight of water with respect to 1 part by weight of each salt in ratios in the aforementioned range of the prescribed atomic ratios according to the present invention, for preparing a mixed aqueous solution.

This mixed aqueous solution is added to the aforementioned slurry and sufficiently stirred/mixed, to be thereafter oxidized. This oxidation is performed by drying the mixture under reduced pressure with a vacuum drier or the like, thereafter drying the mixture at about 50° to 200° C. for about 1 to 48 hours to obtain a dry substance, and firing the obtained dry substance at about 350° to 1000° C., preferably at about 400° to 700° C. for 1 to 12 hours, preferably for about 2 to 4 hours. This firing is preferably so performed that at least a part of the heat-resistant oxide forms a composite oxide and/or a solid solution, thereby improving the heat resistance of the heat-resistant oxide. Preferred firing conditions for forming the composite oxide and/or the solid solution are properly determined in response to the composition and the ratio of the heat-resistant oxide.

The inventive heat-resistant oxide may alternatively be obtained by preparing a solution of salts containing cerium, zirconium and a rare earth metal to be in a prescribed stoichiometric ratio, adding an alkaline aqueous solution to this solution for coprecipitating the salts containing cerium, zirconium and the rare earth metal and thereafter oxidizing the coprecipitate, or by preparing a mixed alkoxide solution containing cerium, zirconium and a rare earth metal, adding deionized water to the mixed alkoxide solution for coprecipitating or hydrolyzing the same and oxidizing the coprecipitate or the hydrolysate.

In this case, the employed salts may be prepared from a cerium salt and the salts described above as examples of the zirconium salt and the rare earth metal salt, while the alkaline aqueous solution may be prepared from an aqueous solution of an alkaline metal salt of sodium or potassium, or ammonia, or a proper well-known buffer. After addition of this alkaline aqueous solution, the solution preferably has a pH value of 8 to 11.

On the other hand, the mixed alkoxide solution is preferably prepared from methoxide, ethoxide, propoxide, butoxide of cerium, zirconium and the rare earth metal or an ethylene oxide adduct thereof, and butoxide is preferably employed.

When the obtained coprecipitate or hydrolysate is oxidized, the precipitate or the hydrolysate is filtrated/washed and thereafter dried preferably at about 50° to 200° C. for about 1 to 48 hours for obtaining a dry substance, so that the obtained dry substance is thereafter fired at about 350° to 1000° C., preferably at 400° to 700° C. for about 1 to 12 hours, preferably at about 2 to 4 hours. This firing is preferably so performed that at least a part of the heat-resistant oxide forms a composite oxide and/or a solid solution, thereby improving the heat resistance of the heat-resistant oxide. Preferred firing conditions for forming the composite oxide and/or the solid solution are properly determined in response to the composition and the ratio of the heat-resistant oxide.

A noble metal is further introduced into the inventive heat-resistant oxide obtained in the aforementioned manner, for providing catalytic activity.

The noble metal can be selected from the platinum group elements consisting of ruthenium (Ru), rhodium (Rh), palladium (Pd), osmium (Os), iridium (Ir) and platinum (Pt), while platinum (Pt), rhodium (Rh) or palladium (Pd) is preferable for forming a three-way catalyst for purifying exhaust gases, and platinum (Pt) is particularly preferably employed. The noble metal is preferably contained in the ratio of 0.01 to 10 parts by weight, preferably 0.05 to 2 parts by weight, to 100 parts by weight of the heat-resistant oxide.

The noble metal may be introduced into the heat-resistant oxide by any well-known method. For example, a solution of a salt containing the noble metal is prepared for impregnating the heat-resistant oxide with this solution. In this case, the salt solution may be prepared from any of the aforementioned salts, while an aqueous nitrate solution, a dinitrodiammine nitrate solution or an aqueous chloride solution is practically employed. The salt solution contains about 1 to 20 percent by weight of the noble metal salt, and is dried preferably at about 50° to 200° C. for about 1 to 48 hours after impregnation, and further fired and carried at about 350° to 1000° C. for about 1 to 12 hours.

In another method, a solution of a noble metal salt is added in the step of coprecipitating or hydrolyzing the salt solution containing cerium, zirconium and the rare earth metal or the mixed alkoxide solution in the aforementioned process of preparing the heat-resistant oxide so that the noble metal salt is coprecipitated with the respective components of the heat-resistant oxide, and thereafter oxidation is performed. In this method, the noble metal is further homogeneously dispersed in the heat-resistant oxide, whereby effective catalytic activity can be attained. The noble metal salt solution employed in this case can be selected from the aforementioned salt solutions such as an aqueous nitrate solution, a dinitrodiammine nitrate solution and an aqueous chloride solution. In more concrete terms, a dinitrodiamine platinum nitrate solution, a platinum chloride salt solution or a tetravalent platinum ammine solution is employed as a platinum salt solution, an aqueous palladium nitrate solution, a dinitrodiamine palladium nitrate solution or a tetravalent palladium ammine nitrate solution is employed as a palladium salt solution, or a rhodium nitrate solution or a rhodium chloride solution is employed as a rhodium salt solution, and the dinitrodiane platinum nitrate solution is preferably employed. This salt solution preferably contains about 1 to 20 percent by weight of the salt.

The subsequent oxidation of the obtained coprecipitate is performed by drying the coprecipitate under reduced pressure with a vacuum drier or the like, further drying the substance preferably at about 50° to 200° C. for about 1 to 48 hours for obtaining a dry substance, and firing the obtained dry substance at about 350° to 1000° C., preferably at about 400° to 700° C. for about 1 to 12 hours, preferably for about 2 to 4 hours.

The inventive heat-resistant oxide further containing a noble metal obtained in the aforementioned manner can be preferably applied to a catalyst for purifying exhaust gases in an oxidation-reduction atmosphere varied with fluctuation of the gas composition under a high temperature, for example, due to the oxygen storage capacity of cerium oxide and the excellent catalytic activity of the noble metal.

EXAMPLES

Example 1

51.2 g (0.136 moles) of cerium isopropoxide, 8.5 g (0.026 moles) of zirconium isopropoxide and 2.4 g (0.009 moles) of yttrium isopropoxide were introduced into a round-bottomed flask of 500 ml, stirred and dissolved with addition of 20 ml of toluene, thereby preparing a mixed alkoxide solution. On the other hand, 600 ml of water was introduced into another round-bottomed flask of 1 l and stirred so that the mixed alkoxide solution was dropped into this water for about 10 minutes, to result in formation of a large quantity of white precipitate. Then, the mixture was heated to distill away the most part of the solvent, thereby obtaining a $Ce_{0.80}Zr_{0.15}Y_{0.05}$ oxide precursor slurry dispersed substance.

Then, 0.604 g of a dinitrodiamine platinum nitrate solution (platinum content: 4.569 percent by weight) was dissolved in 20 ml of water, the $Ce_{0.80}Zr_{0.15}Y_{0.05}$ oxide precursor slurry dispersed substance was added to this solution, the mixture was stirred and mixed, and thereafter water was distilled away under reduced pressure, thereby obtaining a white viscous $Ce_{0.80}Zr_{0.15}Y_{0.05}$ oxide/Pt precursor.

This $Ce_{0.80}Zr_{0.15}Y_{0.05}$ oxide/Pt precursor was dried with ventilation at 60° C. for 24 hours and thereafter fired in an electric furnace at 450° C. for 3 hours, thereby obtaining a yellowish white powdery heat-resistant oxide 1 having the composition of $Ce_{0.80}Zr_{0.15}Y_{0.05}$ oxide/Pt.

Samples of the obtained heat-resistant oxide 1 were aged for 2 hours at temperatures of 800° C., 900° C. and 1000° C. respectively with repetition of a reducing atmosphere, an inactive atmosphere and an oxidizing atmosphere, as shown in Table 3.

Thereafter the samples of the heat-resistant oxide 1 aged at the respective temperatures were subjected to evaluation of oxygen storage capacity and measurement of specific surface areas (BET method). Table 1 shows the results. Table 2 shows changes of the oxygen storage capacity between an unaged initial sample and the sample aged at 1000° C.

The oxygen storage capacity was evaluated as follows:

Evaluation of Oxyaen Storaae Capacity (OSC)

About 20 mg of the powdery heat-resistant oxide 1 was collected as a sample, weight changes were measured with a thermobalance having set conditions shown in Table 4, and the weight change between the steps 8 and 10 was estimated as the quantity occluded and released oxygen, and expressed as the mole number in 1 mole of the sample.

The gas flow rate in this measurement was set at 40 l/min., which is substantially similarly to the actual flow rate of exhaust gases.

Example 2

Operations similar to those in Example 1 were performed except that 35.4 g (0.111 moles) of cerium ethoxide, 13.4 g (0.051 moles) of zirconium ethoxide and 1.9 g (0.009 moles) of yttrium ethoxide were employed as the alkoxide and 0.569 g of a dinitrodiamine platinum nitrate solution was employed as the noble metal salt solution, to obtain a yellowish white powdery heat-resistant oxide 2 having a composition of $Ce_{0.65}Zr_{0.30}Y_{0.05}$ oxide/Pt.

A sample of this heat-resistant oxide 2 was aged at a temperature of 1000° C. for 2 hours with repetition of a reducing atmosphere, an inactive atmosphere and an oxidizing atmosphere under conditions similar to those in Example 1. Thereafter an unaged initial sample and the aged sample of the heat-resistant oxide 2 were subjected to evaluation of oxygen storage capacity, for investigating the change of the oxygen storage capacity between the unaged initial sample and the sample aged at 1000° C. Table 2 also shows the results.

Example 3

Operations similar to those in Example 1 were performed except that 32.7 g (0.102 moles) of cerium ethoxide, 13.9 g (0.051 moles) of zirconium ethoxide and 3.8 g (0.017 moles) of yttrium ethoxide were employed as the alkoxide and 0.505 g of a dinitrodiamine platinum nitrate solution was employed as the noble metal salt solution, to obtain a yellowish white powdery heat-resistant oxide 3 having a composition of $Ce_{0.60}Zr_{0.30}Y_{0.10}$ oxide/Pt.

Samples of this heat-resistant oxide 3 were aged at temperatures of 800° C., 900° C. and 1000° C. respectively, and thereafter subjected to evaluation of oxygen storage capacity and specific surface areas similarly to Example 1. Table 1 shows the results. Table 2 shows the change of the oxygen storage capacity between an unaged initial sample and the sample aged at 1000° C. of the heat-resistant oxide 3.

Example 4

Operations similar to those in Example 1 were performed except that 36.8 g (0.085 moles) of cerium butoxide, 26.1 g (0.068 moles) of zirconium butoxide and 5.2 g (0.017 moles) of yttrium butoxide were employed as the alkoxide and 0.545 g of a dinitrodiammine platinum nitrate solution was employed as the noble metal salt solution, to obtain a yellowish white powdery heat-resistant oxide 4 having a composition of $Ce_{0.50}Zr_{0.40}Y_{0.10}$ oxide/Pt.

A sample of this heat-resistant oxide 4 was aged at a temperature of 1000° C. and thereafter subjected to evaluation of oxygen storage capacity, for investigating the change of the oxygen storage capacity between an initial unaged sample and the sample aged at 1000° C., similarly to Example 2. Table 2 also shows the results.

Example 5

Operations similar to those in Example 1 were performed except that 33.1 g (0.077 moles) of cerium butoxide, 26.1 g (0.068 moles) of zirconium butoxide and 7.8 g (0.025 moles) of yttrium butoxide were employed as the alkoxide and 0.534 g of a dinitrodiammine platinum nitrate solution was employed as the noble metal salt solution, to obtain a yellowish white powdery heat-resistant oxide 5 having a composition of $Ce_{0.45}Zr_{0.40}Y_{0.15}$ oxide/Pt.

A sample of this heat-resistant oxide 5 was aged at a temperature of 1000° C. and thereafter subjected to evaluation of oxygen storage capacity, for investigating the change of the oxygen storage capacity between an unaged initial sample and the sample aged at 1000° C. of the heat-resistant oxide 5, similarly to Example 2. Table 2 also shows the results.

Example 6

Operations similar to those in Example 1 were performed except that 29.4 g (0.068 moles) of cerium butoxide, 29.4 g (0.077 moles) of zirconium butoxide and 7.8 g (0.025 moles) of yttrium butoxide were employed as the alkoxide and 0.525 g of a dinitrodiammine platinum nitrate solution was employed as the noble metal salt solution, to obtain a yellowish white powdery heat-resistant oxide 6 having a composition of $Ce_{0.40}Zr_{0.45}Y_{0.15}$ oxide/Pt.

Samples of this heat-resistant oxide 6 were aged at temperatures of 800° C., 900° C. and 1000° C. respectively, and thereafter subjected to evaluation of oxygen storage capacity and specific surface areas, similarly to Example 1. Table 1 shows the results. Table 2 shows the change of the oxygen storage capacity between an unaged initial sample and the sample aged at 1000° C. of the heat-resistant oxide 6.

Example 7

Operations similar to those in Example 1 were performed except that 16.9 g (0.034 moles) of cerium ethoxyethylate, 45.7 g (0.102 moles) of zirconium ethoxyethylate and 12.1 g (0.034 moles) of yttrium ethoxyethylate were employed as the alkoxide and 0.488 g of a dinitrodiammine platinum nitrate solution was employed as the noble metal salt solution, to obtain a yellowish white powdery heat-resistant oxide 7 having a composition of $Ce_{0.20}Zr_{0.60}Y_{0.20}$ oxide/Pt.

Samples of this heat-resistant oxide 7 were aged at temperatures of 800° C., 900° C. and 1000° C. respectively, and thereafter subjected to evaluation of oxygen storage capacity and specific surface areas, similarly to Example 1. Table 1 shows the results. Table 2 shows the change of the oxygen storage capacity between an unaged initial sample and the sample aged at 1000° C. of the heat-resistant oxide 7.

Example 8

Operations similar to those in Example 1 were performed except that 5.5 g (0.017 moles) of cerium ethoxide, 32.4 g (0.119 moles) of zirconium ethoxide and 7.6 g (0.034 moles) of yttrium ethoxide were employed as the alkoxide and 0.468 g of a dinitrodiammine platinum nitrate solution was employed as the noble metal salt solution, to obtain a yellowish white powdery heat-resistant oxide 8 having a composition of $Ce_{0.10}Zr_{0.70}Y_{0.20}$ oxide/Pt.

A sample of this heat-resistant oxide 8 was aged at a temperature of 1000° C. and thereafter subjected to evaluation of oxygen storage capacity, for investigating the change of the oxygen storage capacity between an unaged initial sample and the sample aged at 1000° C. of the heat-resistant oxide 8, similarly to Example 2. Table 2 also shows the results.

Example 9

Operations similar to those in Example 1 were performed except that 3.5 g (0.009 moles) of cerium isopropoxide, 39.7 g (0.121 moles) of zirconium isopropoxide and 12.0 g (0.045 moles) of yttrium propoxide were employed as the alkoxide and 0.460 g of a dinitrodiammine platinum nitrate solution was employed as the noble metal salt solution, to obtain a yellowish white powdery heat-resistant oxide 9 having a composition of $Ce_{0.05}Zr_{0.70}Y_{0.05}$ oxide/Pt.

A sample of this heat-resistant oxide 9 was aged at a temperature of 1000° C. and thereafter subjected to evaluation of oxygen storage capacity, for investigating the change of the oxygen storage capacity between an unaged initial sample and the sample aged at 1000° C. of the heat-resistant oxide 9, similarly to Example 2. Table 2 also shows the results.

Example 10

Operations similar to those in Example 1 were performed except that 33.8 g (0.068 moles) of cerium ethoxyethylate, 30.5 g (0.068 moles) of zirconium ethoxyethylate and 13.8 g (0.034 moles) of lanthanum ethoxyethylate were employed as the alkoxide and 0.565 g of a dinitrodiammine platinum nitrate solution was employed as the noble metal salt solution, to obtain a yellowish white powdery heat-resistant oxide 10 having a composition of $Ce_{0.40}Zr_{0.40}Y_{0.20}$ oxide/Pt.

Samples of this heat-resistant oxide 10 were aged at temperatures of 800° C., 900° C. and 1000° C. respectively, and thereafter subjected to evaluation of oxygen storage capacity and specific surface areas, similarly to Example 1. Table 1 shows the results. Table 2 shows the change of the oxygen storage capacity between an unaged initial sample and the sample aged at 1000° C. of the heat-resistant oxide 10.

Comparative Example 1

Operations similar to those in Example 1 were performed except that only 73.5 g (0.170 moles) of cerium butoxide was employed as the alkoxide and 0.641 g of a dinitrodiammine platinum nitrate solution was employed as the noble metal salt solution, to obtain a yellowish white powdery heat-resistant oxide 11 having a composition of $CeO_2$/Pt.

Samples of this heat-resistant oxide 11 were aged at temperatures of 800° C., 900° C. and 1000° C. respectively, and thereafter subjected to evaluation of oxygen storage capacity and specific surface areas, similarly to Example 1. Table 1 shows the results. Table 2 shows the change of the oxygen storage capacity between an unaged initial sample and the sample aged at 1000° C. of the heat-resistant oxide 11.

Comparative Example 2

Operations similar to those in Example 1 were performed except that 48.9 g (0.128 moles) of zirconium butoxide and 13.1 g (0.043 moles) of yttrium butoxide were employed as the alkoxide and 0.453 g of a dinitrodiammine platinum nitrate solution was employed as the noble metal salt solution, to obtain a yellowish white powdery heat-resistant oxide 12 having a composition of $Zr_{0.75}Y_{0.25}O_{1.875}$/Pt.

Samples of this heat-resistant oxide 12 were aged at temperatures of 800° C., 900° C. and 1000° C. respectively, and thereafter subjected to evaluation of oxygen storage capacity and specific surface areas, similarly to Example 1. Table 1 shows the results. Table 2 shows the change of the oxygen storage capacity between an unaged initial sample and the sample aged at 1000° C. of the heat-resistant oxide 12.

It is understood from Table 1 that Examples 1, 3, 6, 7 and 10 still effectively exhibited their functions in the range of 800° to 1000° C., although the aged samples were reduced in oxygen storage capacity as compared with the unaged initial samples.

Under the high temperatures, the specific surface areas were reduced as the atomic ratios of cerium were increased, while the maximum values of oxygen storage capacity were attained in the range of the cerium atomic ratios of 0.6 (Example 3) to 0.4 (Examples 6 and 10). Thus, it is understood that the inventive heat-resistant oxide has excellent oxygen storage capacity regardless of reduction of the specific surface area.

On the other hand, it is understood from Table 2 that the aged samples were substantially equivalent in oxygen storage capacity to the unaged initial samples in Examples 5 to 10.

In particular, Example 5 having the cerium atomic ratio of 0.45 ($x-y=0.55$) exhibited a rate of change of only 11% although Example 4 having the cerium atomic ratio of 0.5 ($x-y=0.50$) exhibited a rate of change of 36%, and excellent results were obtained in all Examples having the cerium atomic ratios not exceeding 0.45. Particularly in Examples 7 to 9 having the cerium atomic ratios of not more than 0.20 ($x-y=0.80$), the aged samples were absolutely equivalent or superior in oxygen storage capacity to the unaged initial samples.

Although the present invention has been described and illustrated in detail, it is clearly understood that the same is by way of illustration and example only and is not to be taken by way of limitation, the spirit and scope of the present invention being limited only by the terms of the appended claims.

TABLE 1

| Example No (Sample No. | Composition | Initial Stage | | 800° C. | | 900° C. | | 1000° C. | |
|---|---|---|---|---|---|---|---|---|---|
| | | OSC *1 | SSA *2 | OSC | SSA | OSC | SSA | OSC | SSA |
| Ex. 1 (1) | $Ce_{0.80}Zr_{0.15}Y_{0.05}$Oxide/Pt | 78 | 141 | 21 | 43.8 | 17 | 31.2 | 16 | 19.2 |
| Ex. 3 (3) | $Ce_{0.60}Zr_{0.30}Y_{0.10}$Oxide/Pt | 44 | 144 | 29 | 48.5 | 29 | 27.8 | 30 | 25.9 |
| Ex. 6 (6) | $Ce_{0.40}Zr_{0.45}Y_{0.15}$Oxide/Pt | 34 | 146 | 26 | 50.3 | 24 | 44.0 | 31 | 35.3 |
| Ex. 7 (7) | $Ce_{0.20}Zr_{0.60}Y_{0.20}$Oxide/Pt | 18 | 145 | 19 | 47.3 | 19 | 44.2 | 20 | 36.3 |
| Ex. 10 (10) | $Ce_{0.40}Zr_{0.40}La_{0.20}$Oxide/Pt | 28 | 136 | 24 | 45.7 | 25 | 38.8 | 24 | 32.1 |
| Comp. Ex 1 (11) | $CeO_2$/Pt | 87 | 87.4 | 9 | 22.2 | 2 | 12.3 | 0 | 9.5 |
| Comp. Ex 2 (12) | $Zr_{0.75}Y_{0.25}O_{1.875}$/Pt | 0 | 148 | 0 | 56.1 | 0 | 44.5 | 0 | 33.1 |

*1 OSC Measuring Conditions (Measurement at 500° C., Unit: 1/1000 mol · $O_2$/mol · Oxide)
*2 SSA Specific Surface Area (BET Method)

TABLE 2

| Example No. (Sample No.) | Composition | Initial Sample | Sample aged at 1000° C. | Rate of Change (%) *1 |
|---|---|---|---|---|
| Ex. 1 (1) | $Ce_{0.80}Zr_{0.15}Y_{0.05}$Oxide/Pt | 78 | 16 | 79 |
| Ex. 2 (2) | $Ce_{0.65}Zr_{0.30}Y_{0.05}$Oxide/Pt | 64 | 28 | 57 |
| Ex. 3 (3) | $Ce_{0.60}Zr_{0.30}Y_{0.10}$Oxide/Pt | 44 | 30 | 32 |
| Ex. 4 (4) | $Ce_{0.50}Zr_{0.40}Y_{0.10}$Oxide/Pt | 43 | 31 | 36 |
| Ex. 5 (5) | $Ce_{0.45}Zr_{0.40}Y_{0.15}$Oxide/Pt | 39 | 32 | 11 |
| Ex. 6 (6) | $Ce_{0.40}Zr_{0.45}Y_{0.15}$Oxide/Pt | 34 | 31 | 8 |
| Ex. 7 (7) | $Ce_{0.20}Zr_{0.60}Y_{0.20}$Oxide/Pt | 18 | 20 | 10 |
| Ex. 8 (8) | $Ce_{0.10}Zr_{0.70}Y_{0.20}$Oxide/Pt | 9 | 9 | 0 |
| Ex. 9 (9) | $Ce_{0.05}Zr_{0.70}Y_{0.25}$Oxide/Pt | 4 | 4 | 0 |
| Ex. 10 (10) | $Ce_{0.40}Zr_{0.40}Y_{0.20}$Oxide/Pt | 28 | 24 | 14 |
| Comp. Ex 1 (11) | $CeO_2$/Pt | 87 | 0 | 100 |
| Comp. Ex 2 (12) | $Zr_{0.75}Y_{0.25}O_{1.875}$/Pt | 0 | 0 | — |

Measurement at 500° C., Unit: 1/1000 mol · $O_2$/mol · Oxide
*1 Rate of Change = (1 − Aged Value/Initial Value) × 100%

TABLE 3

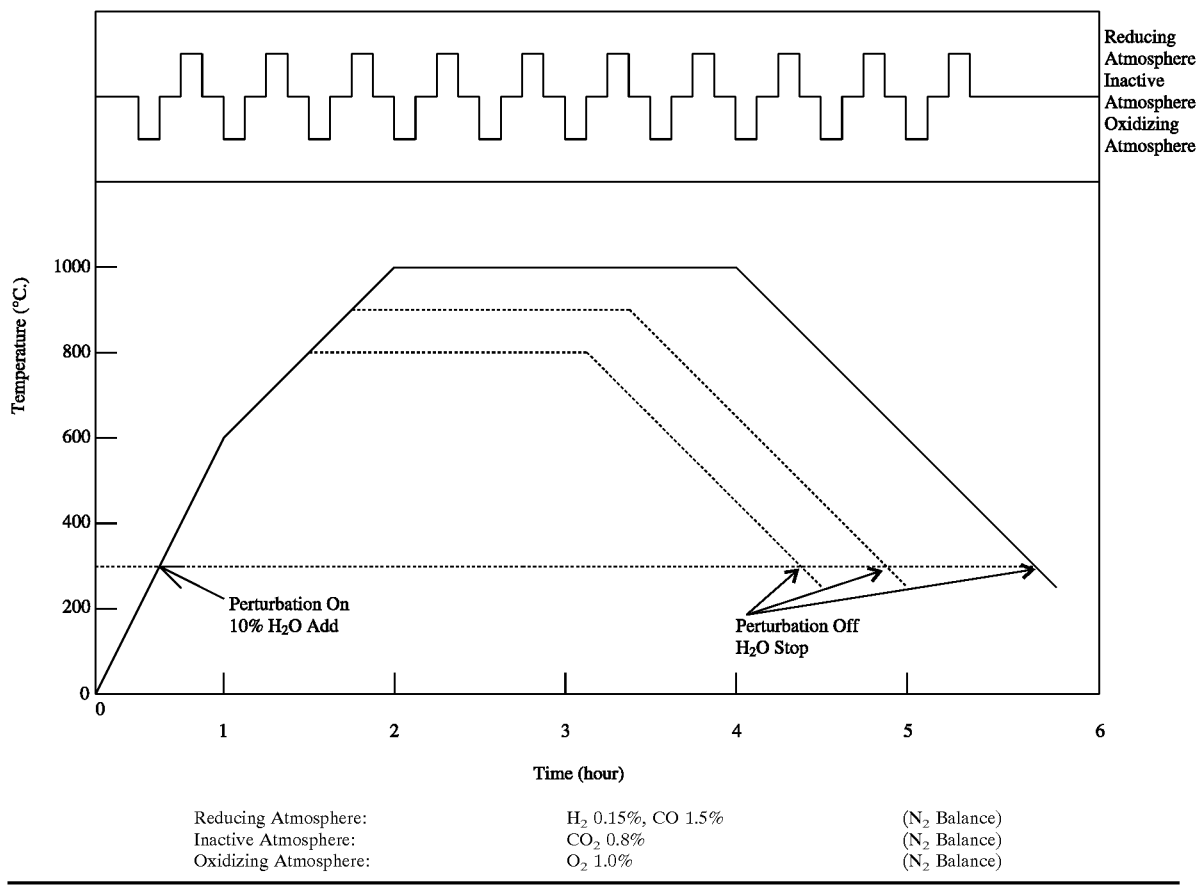

| Reducing Atmosphere: | $H_2$ 0.15%, CO 1.5% | ($N_2$ Balance) |
| Inactive Atmosphere: | $CO_2$ 0.8% | ($N_2$ Balance) |
| Oxidizing Atmosphere: | $O_2$ 1.0% | ($N_2$ Balance) |

TABLE 4

Thermobalance Set Conditions

| Step | Temperature | Time | Atmosphere |
|---|---|---|---|
| 1 | from room to programmed | 20° C./min | 50% $O_2$ ($N_2$ Balance) |
| 2 | at programmed | 15 min | 50% $O_2$ ($N_2$ Balance) |
| 3 | at programmed | 3 min | $N_2$ |
| 4 | at programmed | 7 min | 20% $H_2$ ($N_2$ Balance) |
| 5 | at programmed | 3 min | $N_2$ |
| 6 | at programmed | 7 min | 50% $O_2$ ($N_2$ Balance) |
| 7 | at programmed | 3 min | $N_2$ |
| 8 | at programmed | 7 min | 20% $H_2$ ($N_2$ Balance) |
| 9 | at programmed | 3 min | $N_2$ |
| 10 | at programmed | 7 min | 50% $O_2$ ($N_2$ Balance) |

What is claimed is:

1. A heat-resistant oxide represented by the following formula:

$$Ce_{1-(x+y)}Zr_xR_yO_{2-z}$$

where R is a rare earth metal, z is an oxygen deficiency, x is 0.40 to 0.70, y is 0.15 to 0.25, and x+y is 0.55 to 0.95.

2. The heat-resistant oxide in accordance with claim 1, wherein x represents an atomic ratio of 0.60 to 0.70, y represents an atomic ratio of 0.20 to 0.25, and x+y is in the range of 0.80 to 0.95 in the general formula of said heat-resistant oxide.

3. The heat-resistant oxide in accordance with claim 1, wherein at least a part of said heat-resistant oxide is a composite oxide and/or a solid solution.

4. The heat-resistant oxide in accordance with claim 1, wherein said rare earth metal being represented by R in the general formula of said heat-resistant oxide is yttrium (Y).

5. The heat-resistant oxide in accordance with claim 1, further containing a noble metal.

6. The heat-resistant oxide in accordance with claim 5, wherein said noble metal being contained in said heat-resistant oxide is platinum (Pt).

7. A process for purifying exhaust gas with the heat resistant oxide of claim 1, by contacting the exhaust gas with the catalyst.

8. A process for purifying exhaust gas with the heat resistant oxide of claim 3, by contacting the exhaust gas with the catalyst.

9. A process for purifying exhaust gas with the heat resistant oxide of claim 3, by contacting the exhaust gas with the catalyst.

10. A process for purifying exhaust gas with the heat resistant oxide of claim 4, by contacting the exhaust gas with the catalyst.

11. A process for purifying exhaust gas with the heat resistant oxide of claim 5, by contacting the exhaust gas with the catalyst.

* * * * *